United States Patent
Buckingham et al.

(10) Patent No.: US 10,963,752 B2
(45) Date of Patent: Mar. 30, 2021

(54) MACHINE LEARNING MODEL SCORE OBFUSCATION USING STEP FUNCTION, POSITION-DEPENDENT NOISE

(71) Applicant: Cylance Inc., Irvine, CA (US)

(72) Inventors: Hailey Buckingham, Vancouver, WA (US); David N. Beveridge, Portland, OR (US)

(73) Assignee: Cylance Inc., Irvine, CA (US)

(*) Notice: Subject to any disclaimer, the term of this patent is extended or adjusted under 35 U.S.C. 154(b) by 97 days.

(21) Appl. No.: 16/399,677

(22) Filed: Apr. 30, 2019

(65) Prior Publication Data
US 2020/0349400 A1    Nov. 5, 2020

(51) Int. Cl.
G06K 9/62    (2006.01)
G06F 21/56    (2013.01)
G06N 20/10    (2019.01)

(52) U.S. Cl.
CPC ......... G06K 9/6269 (2013.01); G06F 21/562 (2013.01); G06K 9/6232 (2013.01); G06N 20/10 (2019.01)

(58) Field of Classification Search
CPC .... G06K 9/6269; G06K 9/6232; G06N 20/10; G06F 21/562
See application file for complete search history.

(56) References Cited

U.S. PATENT DOCUMENTS

| 9,324,145 B1 * | 4/2016 | Cherevatsky | G06T 7/42 |
| 9,594,904 B1 * | 3/2017 | Jain | H04L 63/1408 |
| 2002/0183645 A1 * | 12/2002 | Nachaliel | A61B 5/0536 600/547 |
| 2013/0097706 A1 * | 4/2013 | Titonis | G06F 21/56 726/24 |
| 2017/0220929 A1 | 8/2017 | Rozen et al. | |
| 2018/0013772 A1 | 1/2018 | Schmidtler et al. | |
| 2018/0165508 A1 * | 6/2018 | Othman | G06K 9/42 |
| 2018/0330379 A1 | 11/2018 | Zoldi et al. | |
| 2020/0175321 A1 * | 6/2020 | Panging | G06K 9/6223 |
| 2020/0193242 A1 * | 6/2020 | Beveridge | G06N 20/00 |

OTHER PUBLICATIONS

Fakr, "A multi-key compressed sensing and machine learning privacy preserving computer scheme," 2017 5th International Symposium on Computational and Business Intelligence (ISCBI), IEEE, Aug. 11, 2017, pp. 75-80.
Kazdagli et al., "Exploiting latent attack semantics for intelligent malware detection," arXiv:1708.01864v1 [cs.CR] Aug. 6, 2017, pp. 1-18.
Patent Cooperation Treaty, International Patent Application No. PCT/US2020/030247, International Search Report dated Jul. 13, 2020, 5 pages.
Patent Cooperation Treaty, International Patent Application No. PCT/US2020/030247, Written Opinion dated Jul. 13, 2020, 9 pages.
Zhang et al., "Privacy-preserving machine learning through data obfuscation," arXiv:1807.01860v2 [cs.CR] Jul. 13, 2018, 12 pages.

* cited by examiner

Primary Examiner — David Bilodeau
(74) Attorney, Agent, or Firm — Jones Day (57) ABSTRACT

An artefact is received. Features are extracted from this artefact which are, in turn, used to populate a vector. The vector is then input into a classification model to generate a score. The score is then modified using a step function so that the true score is not obfuscated. Thereafter, the modified score can be provided to a consuming application or process. Related apparatus, systems, techniques and articles are also described.

18 Claims, 6 Drawing Sheets

MACHINE LEARNING MODEL SCORE OBFUSCATION USING STEP FUNCTION, POSITION-DEPENDENT NOISE

TECHNICAL FIELD

The subject matter described herein is directed to techniques for obfuscating the output of machine learning models using step functions.

BACKGROUND

Machine learning and other types of artificial intelligence models are being increasingly deployed across different applications and industries. Such models provide classifications which can be based, for example, on historical data with known outcomes or features. The classifications provided by such models (i.e., the model outputs, etc.) can take various forms including a Boolean output (e.g., good/bad, etc.), a numerical score (e.g., 0.00 to 1, 1 to 100, etc.), or a grouping (e.g., automobile, pedestrian, crosswalk, etc.). With some software implementations, the outputs of such models can be intercepted even when part of a larger workflow. Such interception can allow a malicious actor to manipulate the classification by such models by repeatedly providing sample input data until a desired classification is received (even if such classification is not ultimately accurate).

SUMMARY

An artefact is received. Features are extracted from this artefact which are, in turn, used to populate a vector. The vector is then input into a classification model to generate a score. The score is then modified using a step function so that the true score is not obfuscated. Thereafter, the modified score can be provided to a consuming application or process.

In some variations, features in the vector can be reduced prior to it being input into the classification model. The features can be reduced, for example, using random projection matrices, principal component analysis, or other techniques.

The classification model can be a machine learning model trained using a training data set and providing a continuous scale output.

The classification model can characterize the artefact as being malicious or benign to access, execute, or continue to execute. If the artefact is deemed malicious by the classification model, access or execution of the artefact can be prevented.

The machine learning model can include one or more of: a logistic regression model, a neural network, a concurrent neural network, a recurrent neural network, a generative adversarial network, a support vector machine, a random forest, or a Bayesian model.

The step function can apply various types of noise to the score including, for example, position-dependent noise. Different types of step functions/algorithms incorporating step functions can be applied.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for obfuscating the output of an AI/machine learning model. Such obfuscation is particularly important for applications such as malware detection as it prevents a malicious actor from iteratively modifying a malicious file or code until such time that the model classifies such file or code as being safe to execute or otherwise access.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to techniques for obfuscating an output of a software-based classifier. The classifier in this regard can be an AI/machine learning model that outputs at least one value that characterizes the input to such model. While the current subject matter provides examples relating to models used for detection of malicious software ("malware"), it will be appreciated that the current subject matter can, unless otherwise specified, apply to other applications/workflows utilizing a model including, for example, autonomous vehicle navigation systems, image analysis systems, biometric security systems, video game cheat circumvention systems, and the like.

In some cases, the output of a classification model can be intercepted and exploited by a malicious actor as part of an adversarial attack. For example, data exchanged between a client and a remote server executing the classification model can be accessed such that small changes can be made to the data (e.g., file, code, artifact, etc.) input into the classification model until a desired outcome (from the point of view of the malicious actor) is obtained. For example, a malicious actor either automatically or through manual modifications can make small changes to a file encapsulating malicious code until such time that classification model determines that such file is safe to execute or otherwise access.

Figure 1:
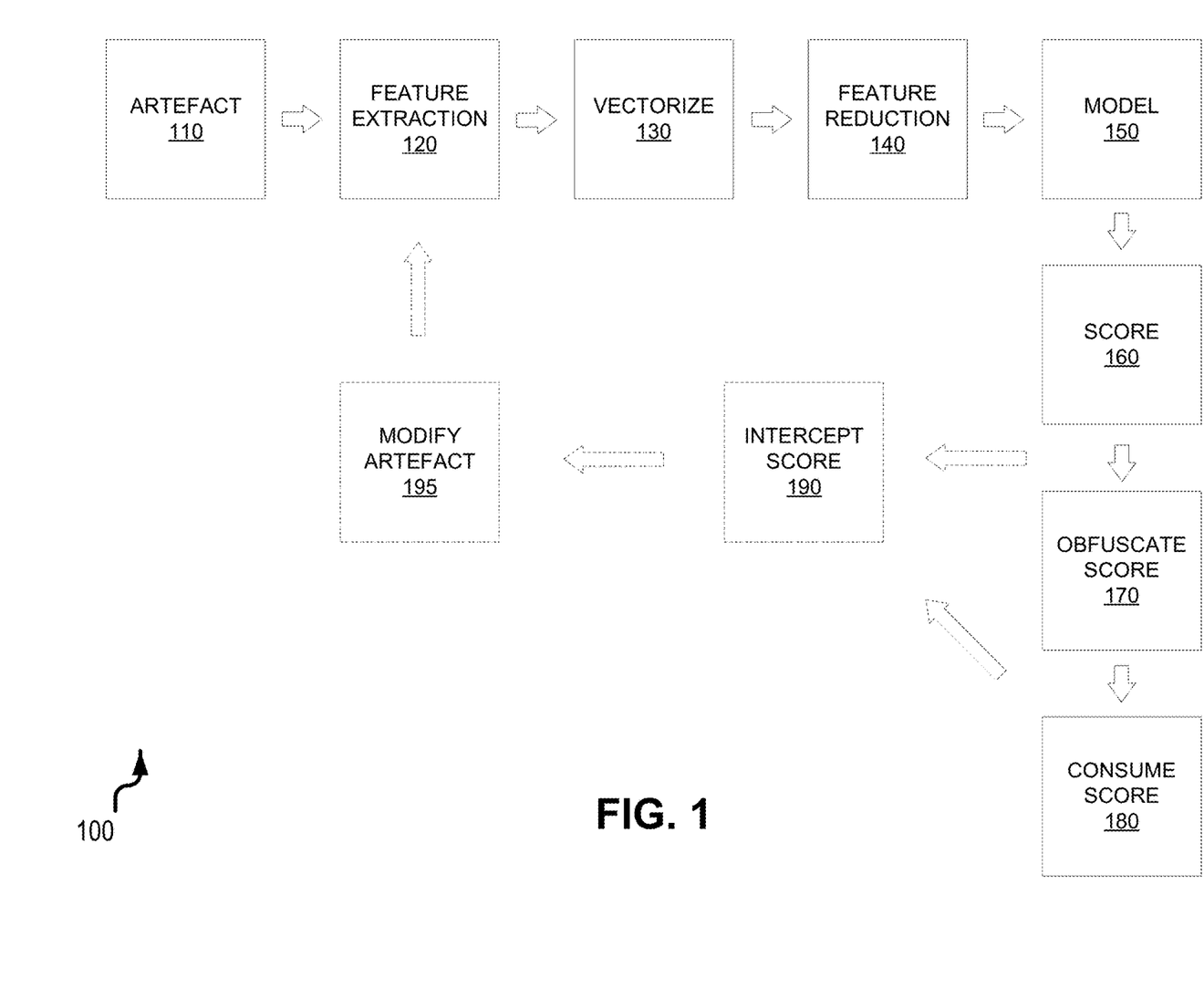
FIG. 1 is a process flow diagram illustrating a first computer-implemented workflow for obfuscating a score from a classification model.

FIG. 1 is a process flow diagram 100 illustrating a sample computer-implemented workflow for use with the current techniques for score obfuscation. Initially, an artefact 110 can be received (e.g., accessed, loaded, received from a remote computing system, etc.). The artefact 110 can be a file, a portion of a file, metadata characterizing a file, and/or source code. This artefact 110 can be parsed or otherwise processed by an observer. In particular, the observer can extract 120 features (sometimes referred to as attributes or observations) from the artefact and vectorize 130 such features. Further, depending on the complexity and/or quantity of features within a vector, a feature reduction operation 140 can be performed on the vector which reduces an amount of dimensions of such vector. The feature reduction operation 140 can utilize various techniques including, but not limited to, principal component analysis and random projection matrices to reduce the number of extracted features within the vector while, at the same time, remaining useful (i.e., for classification purposes, etc.) when input into the classification model 150. The classification model 150 can take many forms including, without limitation, a logistic regression model, a neural network (including concurrent neural networks, recurrent neural networks, generative adversarial networks, etc.), a support vector machine, a random forest, a Bayesian mode, and the like. The output of the classification model 150 can be a score 160 which, as described in further detail below, can be obfuscated 170. As used herein, unless otherwise specified, the score can be a numeric value, a classification type or cluster, or other alphanumeric output which, in turn, can be used by a consuming process 180 or application to take some subsequent action. In some variations, the entity consuming the score, at 180, is provided with the utilized step function so that the underlying score can be determined (i.e., reverse engineered, etc.). In some variations, the obfuscated score can be consumed directly by the entity consuming the score at 180. For malware applications, the score can be used to determine whether or not to access, execute, continue to execute, quarantine, or take some other remedial action which would prevent a software and/or computing system from being infected or otherwise infiltrated by malicious code or other information encapsulated within the artefact 170.

FIG. 1 further illustrates the interception of the score 190. Such interception can occur, for example, when the API of the consuming application is known; by dumping DLL/SO exports with link, nm, objdump; by using various reverse-compilers; by observing stack/heap/registers during execution for function-calling behavior, and the like. Other API (i.e., function)-discovering techniques can also be used.

In an arrangement in which the output of the model 150 can be readily ascertained (e.g., a single model 150 arrangement without score obfuscation), the score 160 can be used by a malicious actor to modify the artefact 195 and repeat the process until such time that a desired score 160 by the corresponding model 150. For example, the modified artefact 195 can encapsulate malicious script and small changes to the artefact 110 could result in the corresponding classification model 150 classifying such modified artefact 195 as being benign.

Modifications to an artefact 150 can be done in such a way as to maintain the original character or nature of the artefact 150. In the example of an actor attempting to modify a malicious file (malware), any modifications must be such that the malware still operates as intended. Such modifications can be made by (for instance) adding to, removing from, or altering un-used portions of the malicious file. As these portions of the file are unused, they have no effect on the realized behavior of the file, but may result in a different score 160 from the model 150. Alternatively or additionally, used sections of the artefact 150 can also be modified, so long as the final function of the malware is left intact.

Whether manually, or in an automated system, the actor or system will typically make many small changes, and get new scores 160 from the model 150. Any change that moved the score 160 in the desired direction (i.e. in the malware example, moving the score closer to a value that is interpreted as benign) is maintained, while other changes are discarded. Such an iterative process can be repeated until the cumulative changes to the artefact 110 result in a cumulative change in the score 150 which accomplishes the desired effect. The obfuscation techniques provided herein can interrupt this cycle of iterative improvements by masking the true effect of each change to an artefact 110 with a false or misleading change in the score 160 which is determined by the obfuscation techniques herein.

Figure 2:
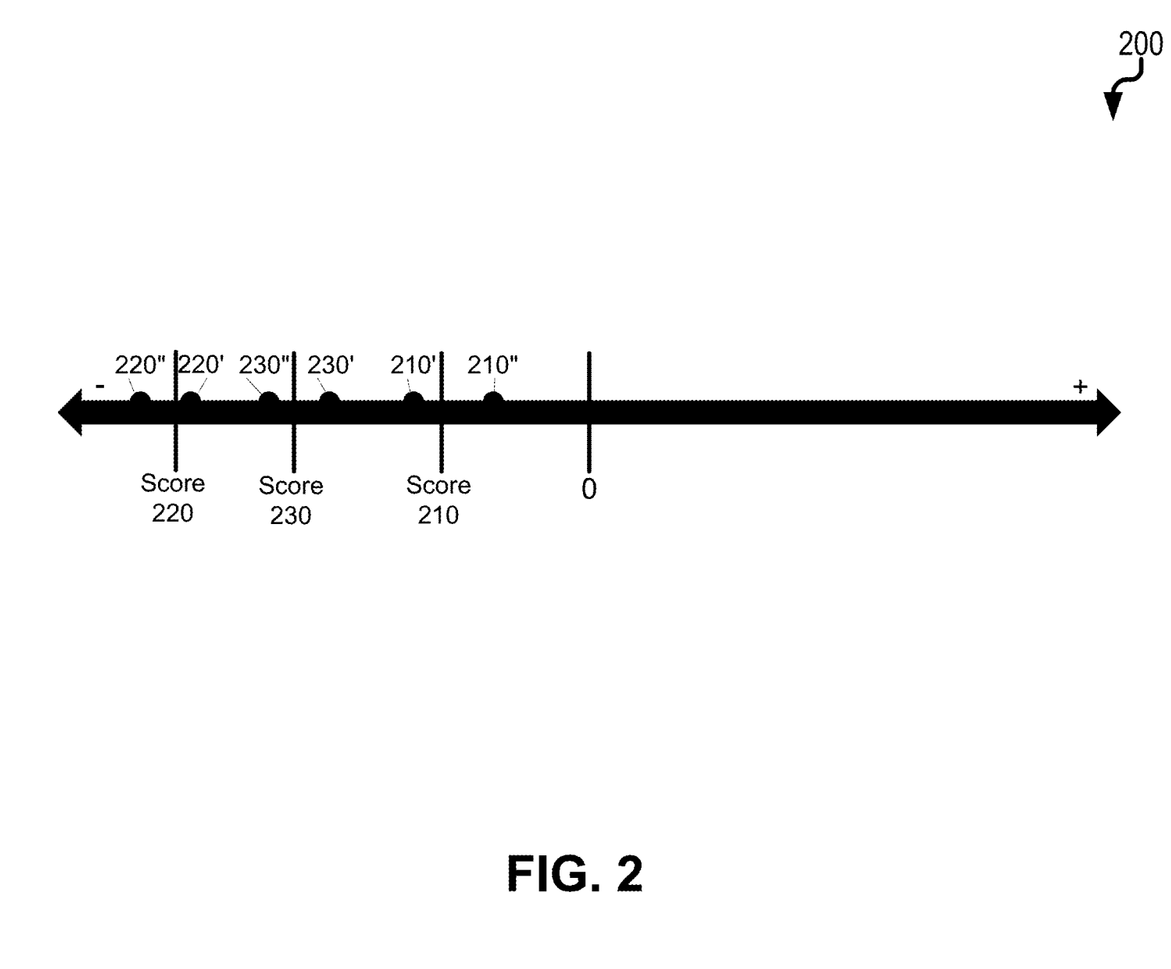
FIG. 2 is a diagram illustrating a first example of obfuscating a score from a classification model using a step function.

The score obfuscation, at 170, causes the output score to be changed to a new value. For example, with reference to diagram 200 of FIG. 2, there are three output scores 210, 220, 230. For the first output score 210 (which corresponds to the obfuscated score), there can be multiple other scores 210', 210", etc. which, when obfuscated, all result in the same output score 210. Similarly, there can be other scores 220'+220", 230'+230" which, when obfuscated, result in different output scores (respectively 220, 230). The score obfuscation operation 170 can use, as an example, a function to associate various scores 160 output by the model 150 with a particular output score (e.g., scores 210, 220, 230). In some cases, the function can be a rounding function. In other cases, more complex functions can be utilized including, for example, a step function utilizing position-dependent noise. With the step function algorithm below, the "position" of the original score in the overall range of scores determines where the final score will end up. This change from original score to final score is the noise, and that noise is determined entirely by the position of the original score. A noise map can be used so that the input score is rounded, or binned, and then the rounded/binned value checked in the noise map, and the associated value is returned as the obfuscated score. In some variations, features of the input vector can be used as additional inputs to the mapping function, such that depending on the values both of the original score, and one or more features from the vector, different obfuscated scores would be the result.

The goal of the utilized step functions is that small changes to the input to the model which would normally yield small score changed by an adversary (i.e., malicious actor) result in no apparent score change.

Another such step function can use some aspect of the original score is to determine the magnitude and direction of the noise to be added to that score. For instance, a trigonometric function, such as a simple sine or cosine function can be used. After the original score is calculated, this trigonometric function can be calculated on that score, and the result would be added to true score to produce the final, obfuscated score. The absolute size of the noise can be limited by a coefficient to ensure that the overall distribution of noises fell within a certain desirable range. Additionally, for scores near the boundary between one classification and another, care can be taken such that this noise would not cause the score to flip over the boundary. To avoid these kinds of flips, a noise attenuation function can be used such that when the true score approaches such a classification boundary, the scale of the noise added to the true score would be reduced such that it was always less than that which would cause a score flip.

Example trigonometric functions are provided below. It will be appreciated that other complex trigonometric functions and/or other types of cyclical functions can be utilized with the current subject matter.

Simple Trigonometric Noise: F(score)=score+(A*sin(B*score)); where A and B are parameters chosen by the implementer. A effects the magnitude of the added noise, and B effects how quickly the noise function changes between similar input scores.

Trigonometric Noise with Truncation: F(score, nearest_score_boundary)=score+min(A*sin(B*score), abs(score-nearest_score_boundary-C)); where A and B are as above, and nearest_score_boundary is the closest score to the input score that represents the boundary between two classifications. In the case were positive score values are interpreted as one class, and negative score values are interpreted as another, then the score boundary would be zero. C is a third parameter chosen by the implementer, which can further limit the score obfuscation from producing values very near a boundary. This function ensures that the obfuscate score never crosses a score boundary Trigonometric Noise with Attenuation: F(score)=score+logistic_fn(abs(score), theta)*A*sin(B*score)); where A and B are as above, logistic_fn is a parameterized logistic function, and theta are the parameters to the logistic function. The logistic function produces a value between 0 and 1, such that when the input score is close to zero, the value of the logistic function is also approaches zero. The parameters, theta, can be chosen such that the logistic function only attenuates the noise within a certain range of zero, as desired by the implementer.

Figure 3:
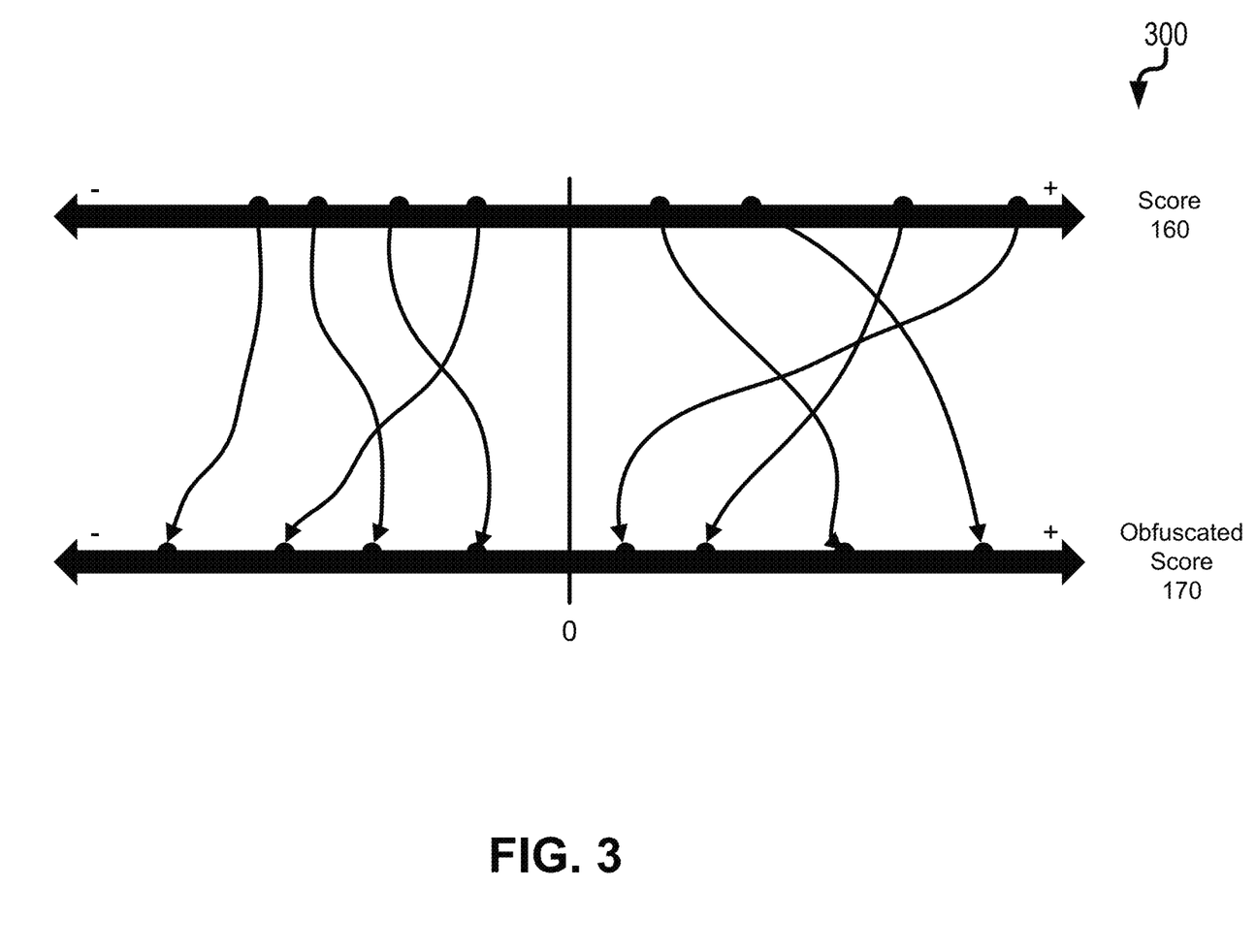
FIG. 3 is a diagram illustrating a second example of obfuscating a score from a classification model using a step function.

Utilizing complex stepping functions is advantageous in that it makes it more difficult to reverse engineer. FIG. 3 is a diagram 300 illustrating the output of a more complex function in which the scores 160 (before obfuscation) are altered (as shown on the obfuscated scores 180 line) in an apparently random manner. As an example of such a function, the range of scores which represent a particular classification (for example, all positive scores, or all negative scores, etc.) can be randomly cut into a large number of very small sections. Each section of the score range could then be mapped randomly to a different output in the same scoring range. When the score 160 is obfuscated 170, this map would be used to convert the true score to the obfuscated score. This mapping could be retained for a period of time so that repeated queries to the model would yield the same obfuscated score. Another example of such a function might use information from the reduced feature vector 140 in the mapping from the true scores to the obfuscated scores.

With the current arrangement, the ultimate classification of the obfuscated scores 170 are maintained. Stated differently, a positive score (indicating that the model output is good) is maintained after the obfuscation and similarly, a negative score is maintained after the obfuscation.

Figure 4:
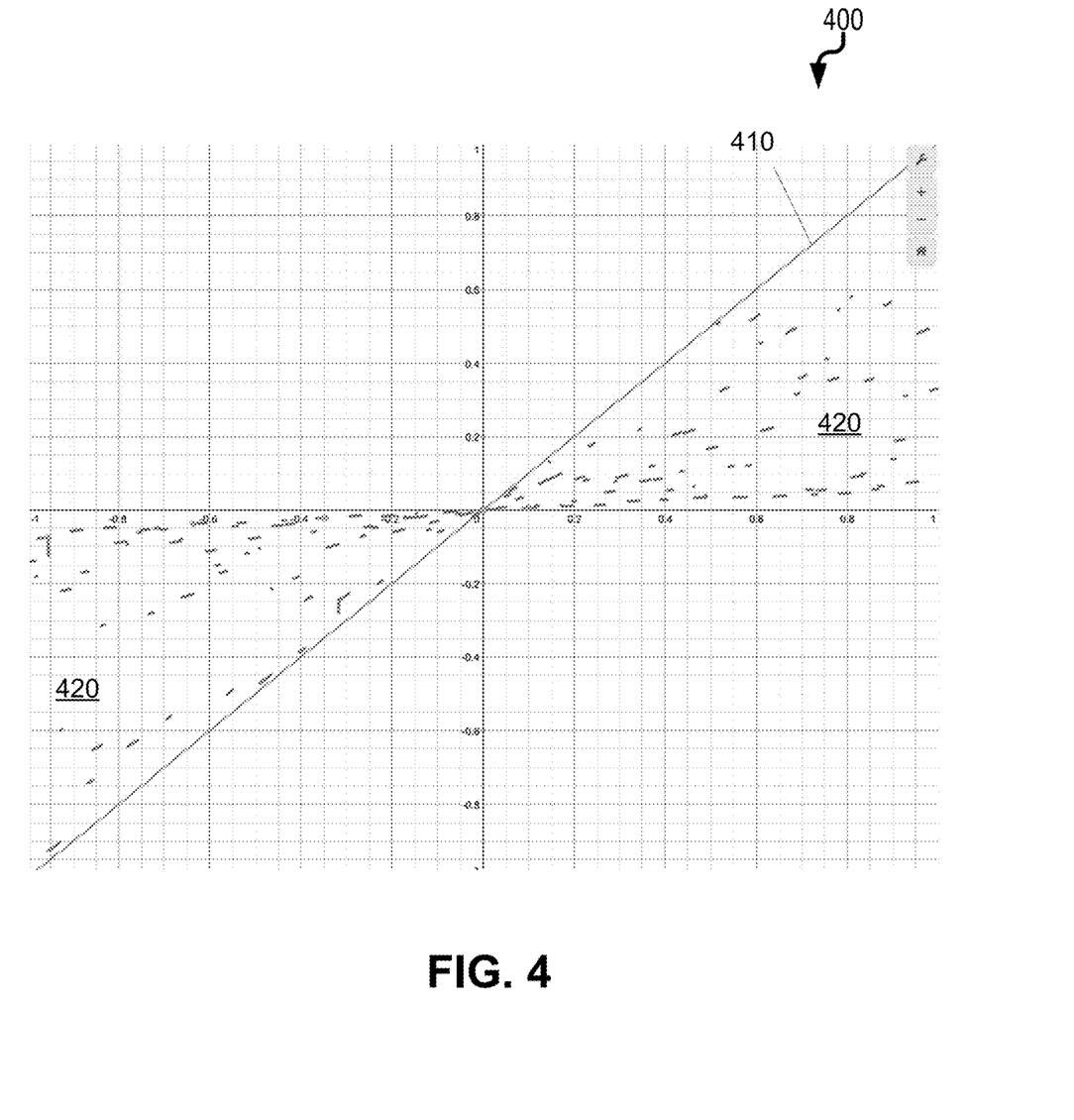
FIG. 4 is a diagram illustrating true vs. obfuscated scores.

Another sample obfuscation equation is as provided:

$$y = \left(\frac{x}{(17)}\right) + x(\sin(\text{floor}(11\pi x))^2 \cdot \cos(ceil(13\pi x))^2)$$

where y is the obfuscated score 170 and x is the original score 160. This obfuscation equation can result in scores as illustrated in diagram 400 of FIG. 4 in which line 410 represents the original scores 160 and the other values 420 correspond to the obfuscated scores 170.

Figure 5:
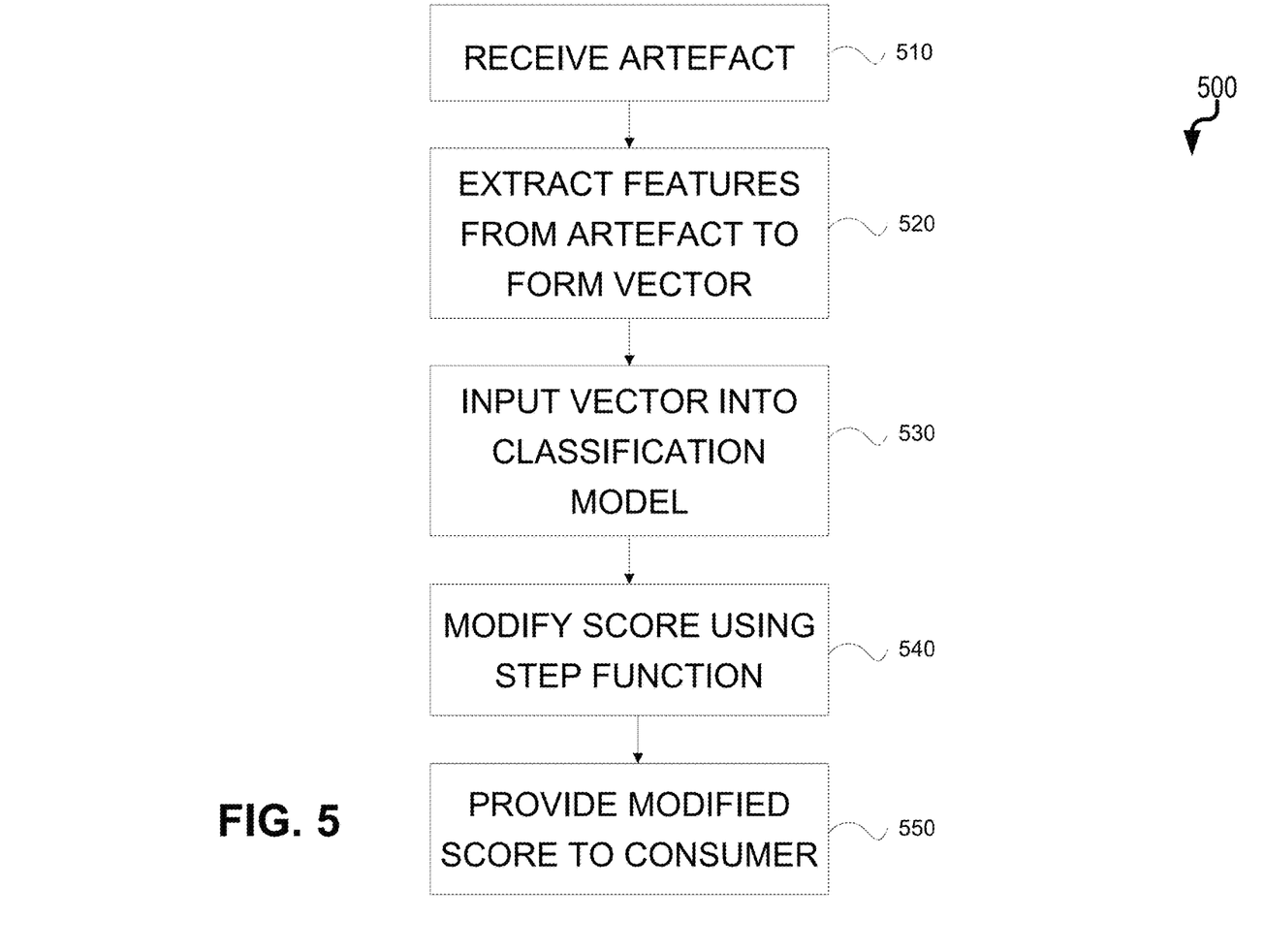
FIG. 5 is a process flow diagram illustrating a second computer-implemented workflow for obfuscating a score from a classification model.

FIG. 5 is a process flow diagram in which, at 510, an artefact is received. Thereafter, at 520, features are extracted from the artefact so that a vector can be populated with such features. Next, at 530, the vector is input into a classification model to generate a score. This score is modified, at 540, using a step function to obfuscate its actual value. Therefore, the modified score is provided, at 550, to a consuming application or process. For example, the consuming application or process can use such score to make a determination of whether or not to access, execute, or continue to execute the artefact (i.e., it can be used to prevent malware from infiltrating a computing and/or software system, etc.).

Figure 6:
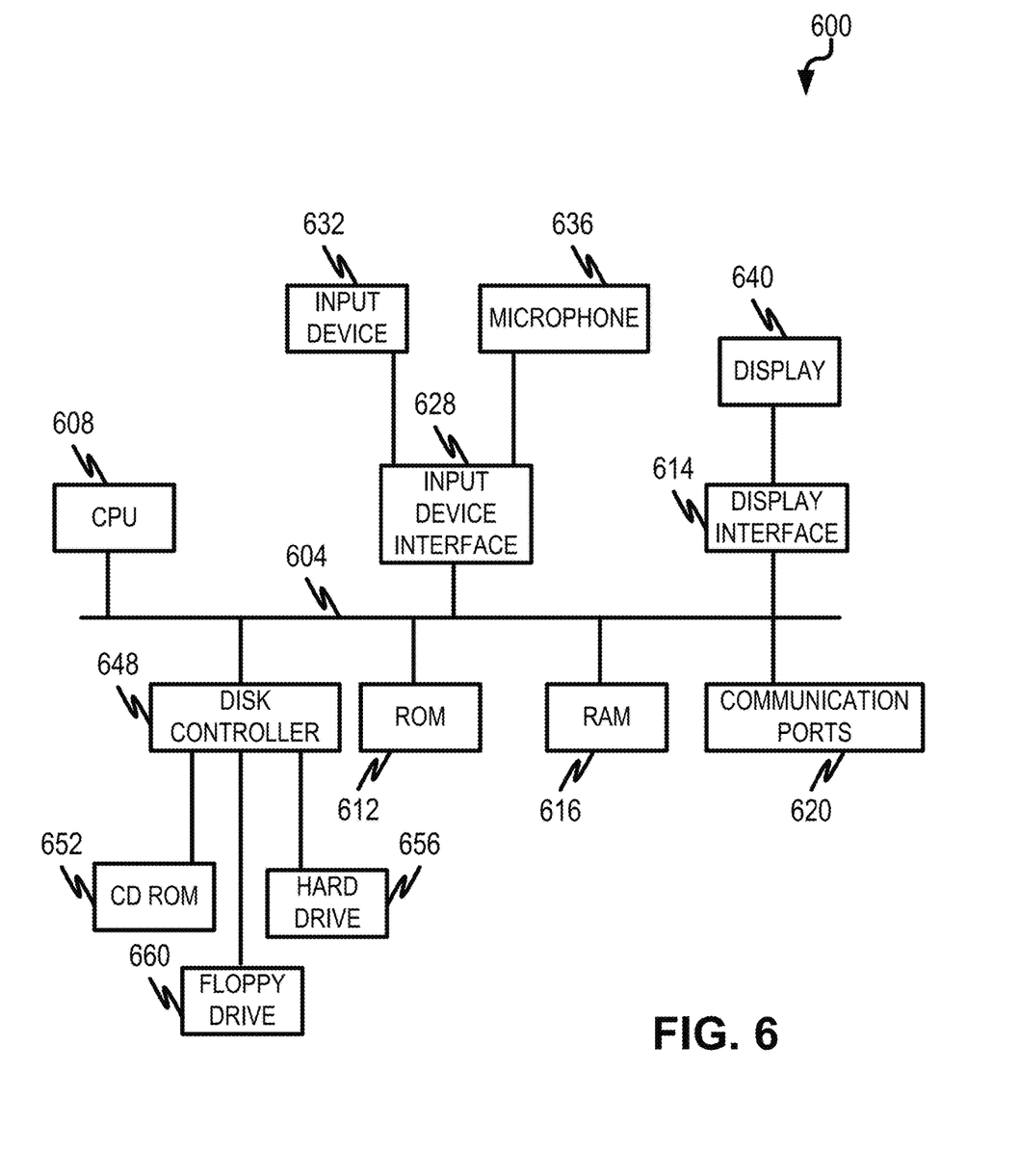
FIG. 6 is a diagram illustrating a computing device that can be used to implement aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers/processor cores, etc.), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving an artefact;
   extracting features from the artefact and populating a vector;
   inputting the vector into a classification model to generate a score;
   modifying the score using a step function that applies position-dependent noise to the score; and
   providing the modified score to a consuming application or process.

2. The method of claim 1 further comprising reducing features in the vector prior to the inputting into the classification model.

3. The method of claim 2, wherein the features are reduced using random projection matrices.

4. The method of claim 2, wherein the features are reduced using principal component analysis.

5. The method of claim 1, wherein the classification model is a machine learning model trained using a training data set and providing a continuous scale output.

6. The method of claim 1, wherein the classification model characterizes the artefact as being malicious or benign to access, execute, or continue to execute.

7. The method of claim 6 further comprising: preventing access or execution of the artefact when the classification model characterizes the artefact as being malicious.

8. The method of claim 1, wherein the machine learning model comprises one or more of: a logistic regression model, a neural network, a concurrent neural network, a recurrent neural network, a generative adversarial network, a support vector machine, a random forest, or a Bayesian model.

9. A system comprising:
at least one data processor; and
memory storing instructions which, when executed by the at least one data processor, result in operations comprising:
receiving an artefact;
extracting features from the artefact and populating a vector;
inputting the vector into a classification model to generate a score;
modifying the score using a step function that applies position-dependent noise to the score; and
providing the modified score to a consuming application or process.

10. The system of claim 9, wherein the operations further comprising: reducing features in the vector prior to the inputting into the classification model.

11. The system of claim 10, wherein the features are reduced using random projection matrices.

12. The system of claim 10, wherein the features are reduced using principal component analysis.

13. The system of claim 9, wherein the classification model is a machine learning model trained using a training data set and providing a continuous scale output.

14. The system of claim 9, wherein the classification model characterizes the artefact as being malicious or benign to access, execute, or continue to execute.

15. The system of claim 14, wherein the operations further comprise: preventing access or execution of the artefact when the classification model characterizes the artefact as being malicious.

16. The system of claim 9, wherein the machine learning model comprises one or more of: a logistic regression model, a neural network, a concurrent neural network, a recurrent neural network, a generative adversarial network, a support vector machine, a random forest, or a Bayesian model.

17. A computer-implemented method comprising:
receiving a file;
extracting features from the file and populating a vector;
inputting the vector into a classification model to generate a score, the classification model being a machine learning model trained to characterize a likelihood of the file as being malicious;
obfuscating the score using a step function that applies position-dependent noise to the score; and
providing the modified score to a consuming application or process.

18. The method of claim 17 further comprising:
preventing access or execution of the artefact when the classification model characterizes the artefact as being malicious.

\* \* \* \* \*